(12) United States Patent
Katayama et al.

(10) Patent No.: US 6,662,102 B2
(45) Date of Patent: Dec. 9, 2003

(54) MOVABLE BODY PROGRESS DIRECTION NAVIGATING APPARATUS

(75) Inventors: Mutsumi Katayama, Saitama (JP); Hiroyuki Morita, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 32 days.

(21) Appl. No.: 10/066,634

(22) Filed: Feb. 6, 2002

(65) Prior Publication Data
US 2002/0107635 A1 Aug. 8, 2002

(30) Foreign Application Priority Data
Feb. 6, 2001 (JP) .......................... 2001-029495

(51) Int. Cl.[7] .......................... G01C 21/00; G01C 21/26
(52) U.S. Cl. ........................ 701/206; 701/207
(58) Field of Search ............................. 701/200, 201, 701/211, 213, 300, 206, 207; 342/357.06, 357.07, 357.13

(56) References Cited

U.S. PATENT DOCUMENTS

| | | | |
|---|---|---|---|
| 4,403,291 A | | 9/1983 | Von Tomkewitsch |
| 6,199,010 B1 | * | 3/2001 | Richton ............... 701/206 |
| 6,278,938 B1 | * | 8/2001 | Alumbaugh ........... 701/208 |

FOREIGN PATENT DOCUMENTS

| | | |
|---|---|---|
| EP | 0 762 361 A1 | 3/1997 |
| EP | 0 767 358 A1 | 4/1997 |
| EP | 0 782 118 A1 | 7/1997 |
| JP | 11-14390 | 1/1999 |

* cited by examiner

Primary Examiner—Michael J. Zanelli
(74) Attorney, Agent, or Firm—Birch, Stewart, Kolasch & Birch, LLP

(57) ABSTRACT

To provide a movable body progress direction navigating apparatus capable of correct navigation without requiring a large storage capacity. A movable body progress direction navigating apparatus for navigating a movable body in a predetermined progress direction includes a position detector for continuously detecting positional data of a movable body to obtain a position thereof; a directional data generator for generating, on the basis of the locus of the movable body, at least one of approach directional data obtained when the movable body has entered into a predetermined via-point and departing directional data obtained when the movable body has departed from the via-point; a directional data storage for storing at least one of the approach direction data and the departing directional data in association with positional data of the via-point; and when the movable body has approached the via-point, a navigator for navigating the movable body in a predetermined progress direction, on the basis of at least one of the approach directional data or the departing directional data, whichever is stored in the directional data storage.

19 Claims, 11 Drawing Sheets

FIG. 7(a)

METHOD 1

| IDENTIFICATION | LONGITUDE INFORMATION | LATITUDE INFORMATION | DATE | TIME |
|---|---|---|---|---|
| WP1 | N 35.40.09.00 | E 139.43.37.5 | 2000.09.12 | 13:35 |

| APPROACH COORDINATES | | DEPARTING COORDINATES | | REMARKS |
|---|---|---|---|---|
| N 35.40.07.0 | E 139.43.39.0 | N 35.40.08.5 | E 139.43.35.0 | |

FIG. 7(b)

METHOD 2

| IDENTIFICATION | LONGITUDE INFORMATION | LATITUDE INFORMATION | TIME | DATE |
|---|---|---|---|---|
| WP1 | N 35.40.09.00 | E 139.43.37.5 | 2000.09.12 | 13:35 |

| APPROACH COORDINATES DIFFERENCE | | DEPARTING COORDINATES DIFFERENCE | | REMARKS |
|---|---|---|---|---|
| -0.2 | -1.5 | -0.5 | -2.5 | |

FIG. 7(c)

METHOD 3

| IDENTIFICATION | LONGITUDE INFORMATION | LATITUDE INFORMATION | DATE | TIME |
|---|---|---|---|---|
| WP1 | N 35.40.09.00 | E 139.43.37.5 | 2000.09.12 | 13:35 |

| APPROACH BEARING | DEPARTING BEARING | REMARKS |
|---|---|---|
| SSE | WSW | |

FIG. 7(d)

MODIFIED METHOD 3

| IDENTIFICATION | LONGITUDE INFORMATION | LATITUDE INFORMATION | DATE | TIME |
|---|---|---|---|---|
| WP1 | N 35.40.09.00 | E 139.43.37.5 | 2000.09.12 | 13:35 |

| APPROACH BEARING | DEPARTING BEARING | REMARKS |
|---|---|---|
| 7 | 10 | |

FIG. 7(e)

METHOD 4

| IDENTIFICATION | LONGITUDE INFORMATION | LATITUDE INFORMATION | DATE | TIME |
|---|---|---|---|---|
| WP1 | N 35.40.09.00 | E 139.43.37.5 | 2000.09.12 | 13:35 |

| APPROACH DEPARTING BEARING | REMARKS |
|---|---|
| 6 | |

MOVABLE BODY PROGRESS DIRECTION NAVIGATING APPARATUS

CROSS-REFERENCES TO RELATED APPLICATIONS

This nonprovisional application claims priority under 35 U.S.C. §119(a) on Patent Application No. 2001-029495 filed in Japan on Feb. 6, 2001, the entirety of which is herein incorporated by reference.

BACKGROUND OF THE INVENTION

1. Field of the Invention

The present invention relates to a movable body progress direction navigating apparatus for navigating a movable body such as a vehicle or a walking human being, for example, in a predetermined progress direction. In particular, the present invention is directed to a movable body progress direction navigating apparatus which is portable to facilitate the carriage, for example, on two-wheeled vehicles and pedestrians, to correctly navigate them from a via-point in a predetermined direction.

2. Description of Related Art

Navigation systems for displaying an optimum route from a start point to a destination through registration beforehand are in wide use. In addition, a navigation system (a first related art technology) having a back-track mode and known as product name "Magellan GPS 3000 Satellite Navigator" has been sold since December 1995 in Japan from Mazellan Systems Japan Corporation. In the first related art technology, via-points are sequentially registered as "waypoints" halfway between a start point and destination. Furthermore, in a return mode, the registered waypoints are followed in a reverse manner to correctly reach the start point by traveling along the same route as the outward route. In this back-track mode, the distance and direction from each waypoint to another are displayed in each return route.

In a technology (a second related art technology) disclosed in Japanese Patent Laid-open No. Hei 11-14390, when registering via-points beforehand, the longitude and latitude of each via-point are inputted as via-point data. At the same time, the progress direction from each via-point is inputted as an absolute bearing, thereby displaying a progress direction of a movable body when it approaches each via-point.

In the above-mentioned first related art technology, the current positions can be registered as via-point data (waypoints) during traveling; however, the approach direction to each waypoint and the departing direction therefrom cannot be registered. Consequently, as shown in FIG. 9, the progress direction represented by waypoint WP2 in the back track mode in the return route becomes the direction of the next (one point before in approach route) waypoint WP1 as shown in a dashed-line circle.

Hence, as shown, unless the direction of the line segment connecting between adjacent waypoints WP2 and WP1 matches the direction of the road running from waypoint PW2 to waypoint PW1, a wrong return route displayed at waypoint WP2 may be indicated.

Although the above-mentioned problem can be solved by registering many waypoints during traveling, it increases a memory capacity necessary for storing the registered waypoints. Accordingly, such a solution is unrealistic.

In the above-mentioned second related art technology, the progress direction from each via-point inputted for the approach route cannot be used for the return route. Therefore, similar to the above-mentioned first related art technology, if the road status is as shown in FIG. 9, the movable body may be navigated along a wrong return route.

SUMMARY OF THE INVENTION

It is therefore an object of the present invention to solve the above-described problems, and to provide a movable body progress direction navigating apparatus, which correctly navigates a movable body without requiring a large memory capacity.

In order to attain the above object, the present invention is directed to a movable body progress direction navigating apparatus for navigating a movable body in a predetermined direction, including a position detector for continuously detecting positional data of a movable body to obtain a position thereof; a directional data generator for generating, on the basis of the locus of the movable body, at least one of approach directional data obtained when the movable body has entered into a predetermined via-point and departing directional data obtained when the movable body has departed from the via-point; a directional data storage for storing at least one of the approach direction data and the departing directional data in association with positional data of the via-point; and when the movable body has approached the via-point, a navigator for navigating the movable body in a predetermined progress direction, on the basis of at least one of the approach directional data or the departing directional data, whichever is stored in the directional data storage.

According to the above-mentioned characteristics, the approach directional data and departing direction data of a movable body are stored in memory for each via-point. Accordingly, when the movable body subsequently passes each via-point again, the movable body can be correctly navigated in the normal direction from each via-point on the basis of the stored approach directional data and departing directional data.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 7(a) to 7(e) are diagrams illustrating examples of waypoint data formats;

DETAILED DESCRIPTION OF THE PREFERRED EMBODIMENTS

Figure 1:
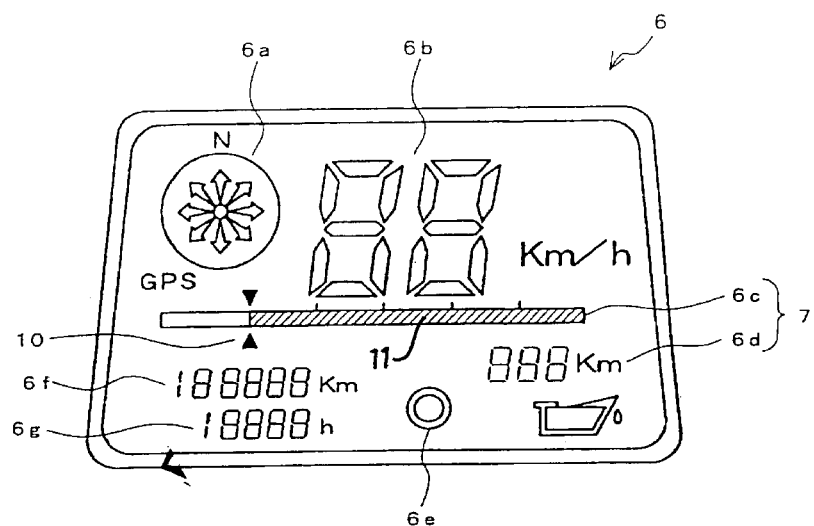
FIG. 1 is a view of a display panel of a movable body incorporating a progress direction navigating system according to the invention.

The present invention will now be described in further detail by way of example with reference to the accompanying drawings. Referring to FIG. 1, a front view of an exemplary display panel of a movable body incorporating a progress direction navigating system according to the invention is illustrated. In the present invention, the movable body is embodied in a vehicle; however, it should be recognized that the present invention could be embodied in other movable bodies as well.

A display panel 6 includes a direction display section 6a for indicating the direction of a destination. The progress direction (N) of the vehicle is located above. The display panel 6 also includes a speed meter 6b, a remaining distance bar graph 6c for indicating the distance to the destination to be traveled in a bar graph, a remaining distance meter 6d for indicating the distance to be traveled in a numeric value, a remaining distance set button 6e, a distance meter 6f for indicating a total travel distance of the vehicle, and a time meter 6g for indicating a total travel time.

Figure 2A:
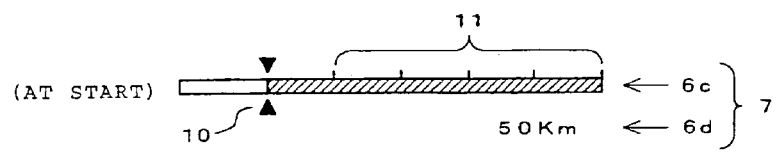
FIGS. 2(*a*) and 2(*b*) are diagrams explaining the function of a remaining distance bar graph.
Figure 2B:
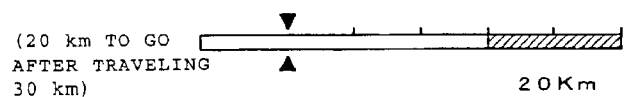

The direction display section 6a can show 8 directions with intervals of 45 degrees. The remaining distance bar graph 6c includes a reference distance marker 10 and five equidistant scales 11 for example. When a destination is set (at the time of start), the remaining distance bar graph 6c is colored (in blue for example) full scale to the right from the reference distance marker 10 and a distance along a straight line from the current position to the destination is shown by a numeric value. For example, if a total distance from the current position to the destination is 500 km, the bar graph is displayed full scale as shown in FIG. 2(a) and a remaining distance of 50 km is displayed by numeric value on the remaining distance meter 6d.

If the vehicle approaches the destination by 30 km for example, the remaining distance bar graph 6c turns off up to the third scale from the reference distance marker 10, turning off the section to the right of the third scale. The remaining distance meter 6d shows a remaining distance of 20 km by numeric value.

Figure 3:
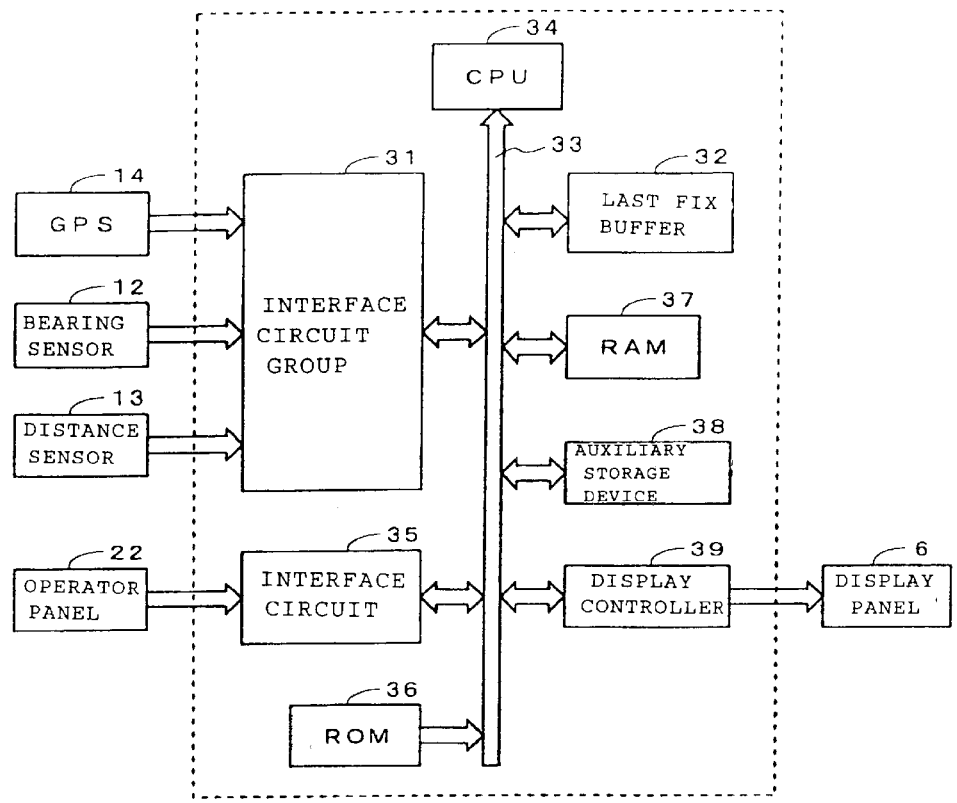
FIG. 3 is a block diagram illustrating a circuit configuration of a meter unit.

FIG. 3 is a block diagram illustrating a circuit configuration of the abovementioned meter unit. A GPS (Global Positioning System) 14 receives signals from artificial satellites to measure the current position (longitude and latitude) of the vehicle. A bearing sensor 12 detects the current position and bearing of the vehicle. A distance sensor 13 detects a travel distance of the vehicle. The GPS 14, the bearing sensor 12, and the distance sensor 13 are connected to a system bus 33 via an interface circuit group 31.

The operator panel 22 has a scroll button for use in setting a destination, for example, operator buttons for setting waypoints and a backtrack mode to be described later. The operator panel 22 is connected to the system bus 33 via the interface circuit 35.

On the basis of the information captured from the GPS 14, the bearing sensor 12, the distance sensor 12 and a control program previously stored in a ROM 36, a CPU 34 obtains the direction of the destination relative to the current vehicle position, a distance from the current position to the destination, and so on. The CPU 34 outputs the obtained information to the display panel 6 via a display controller 39. A RAM 37 provides a work area for the CPU 34.

Figure 4:
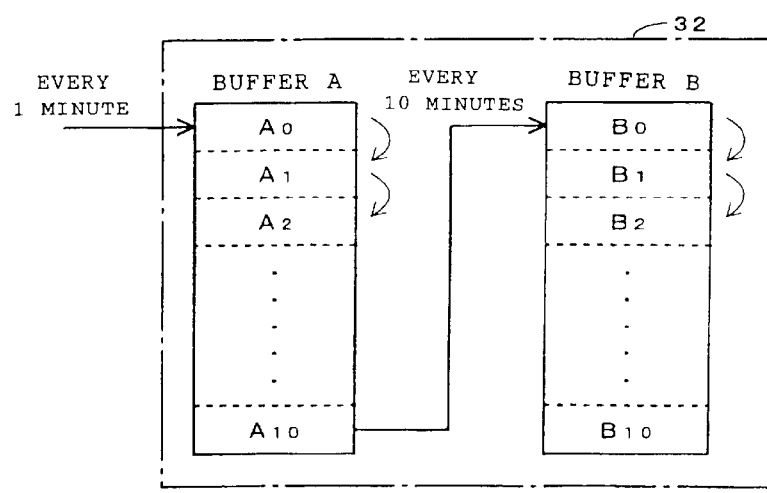
FIG. 4 is a diagram illustrating a first embodiment of a last fix buffer.

An auxiliary storage device 38 is an easily-detachable storage medium, such as an IC card. A last fix buffer 32 is constituted by a pair of FIFO buffers A and B as shown in FIG. 4 in which the positional data indicative of current position detected by the GPS 14 are stored in a periodic manner.

Figure 5:
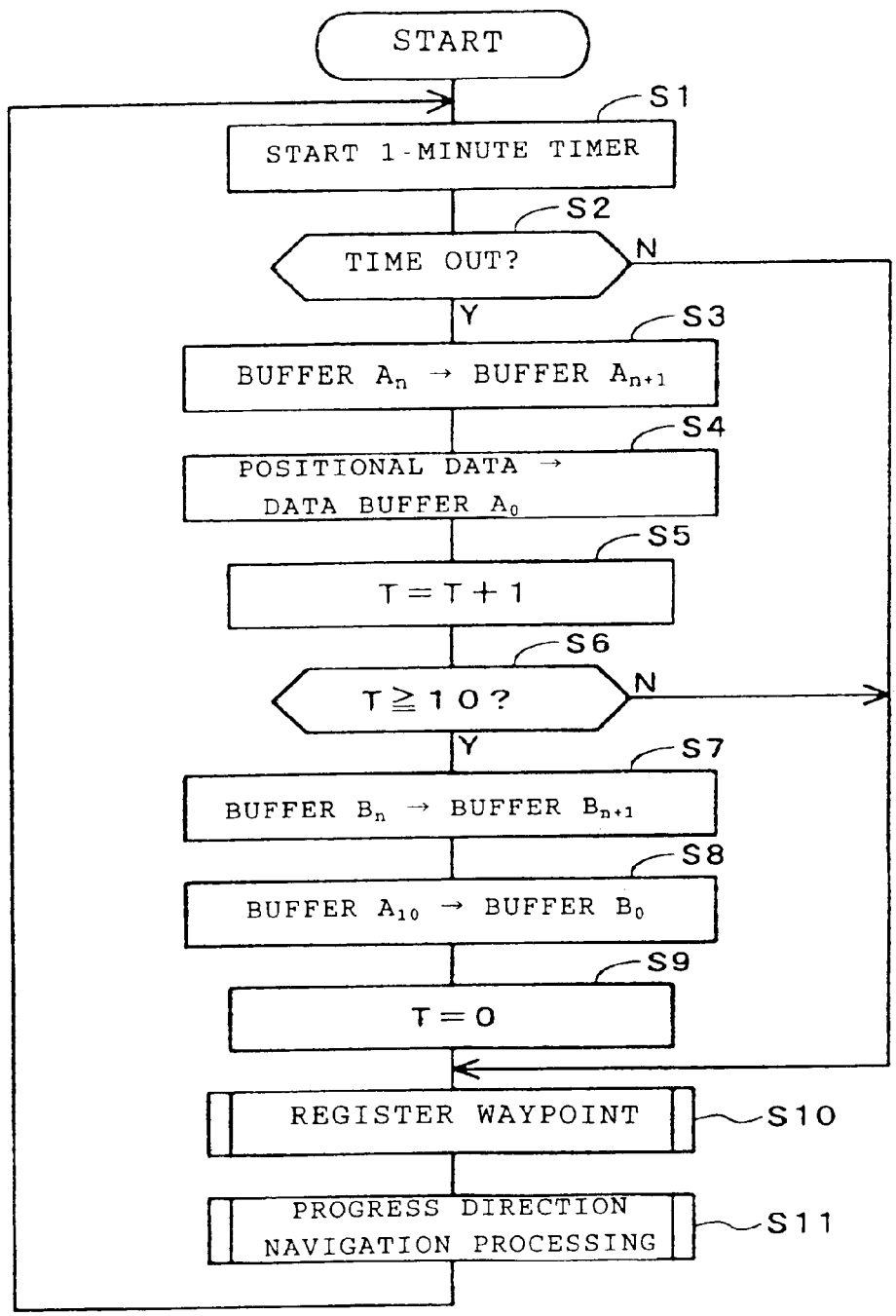
FIG. 5 is a flowchart describing an operation of the present embodiment.
Figure 6:
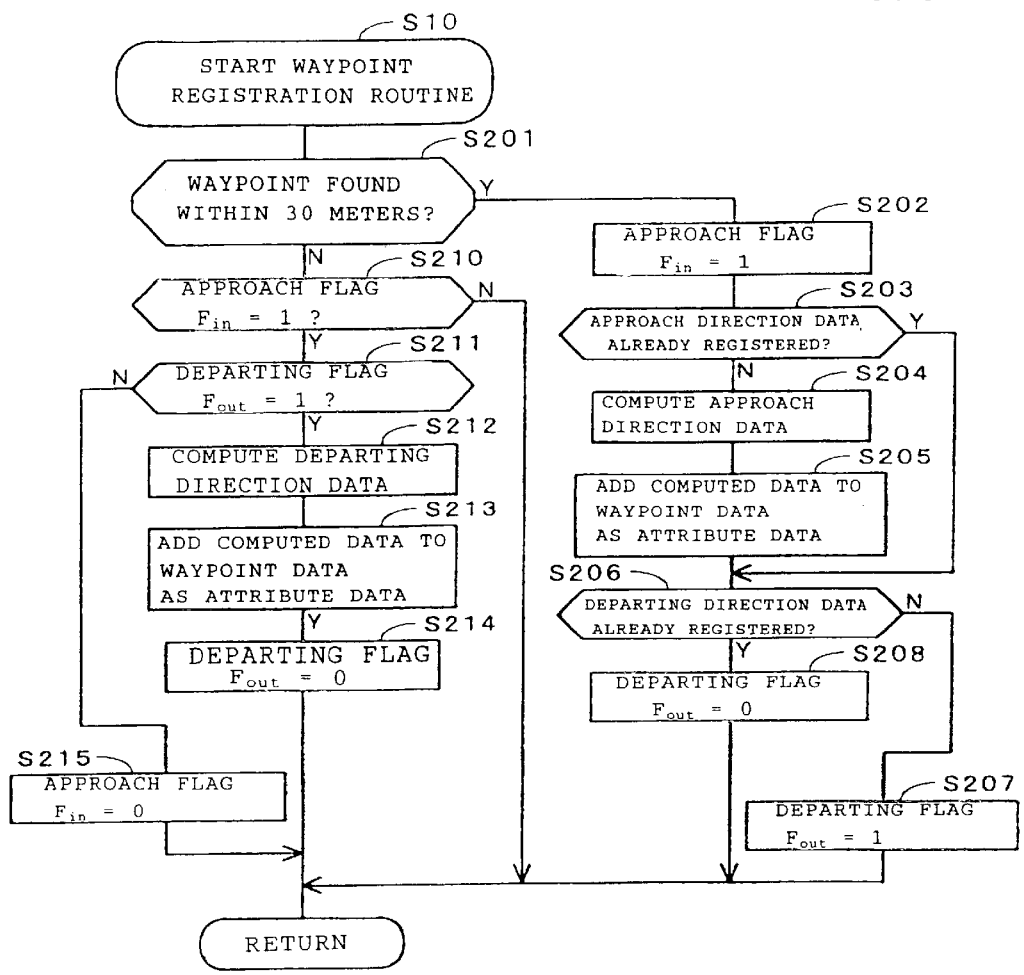
FIG. 6 is a flowchart describing an operation of waypoint registration processing.
Figure 8:
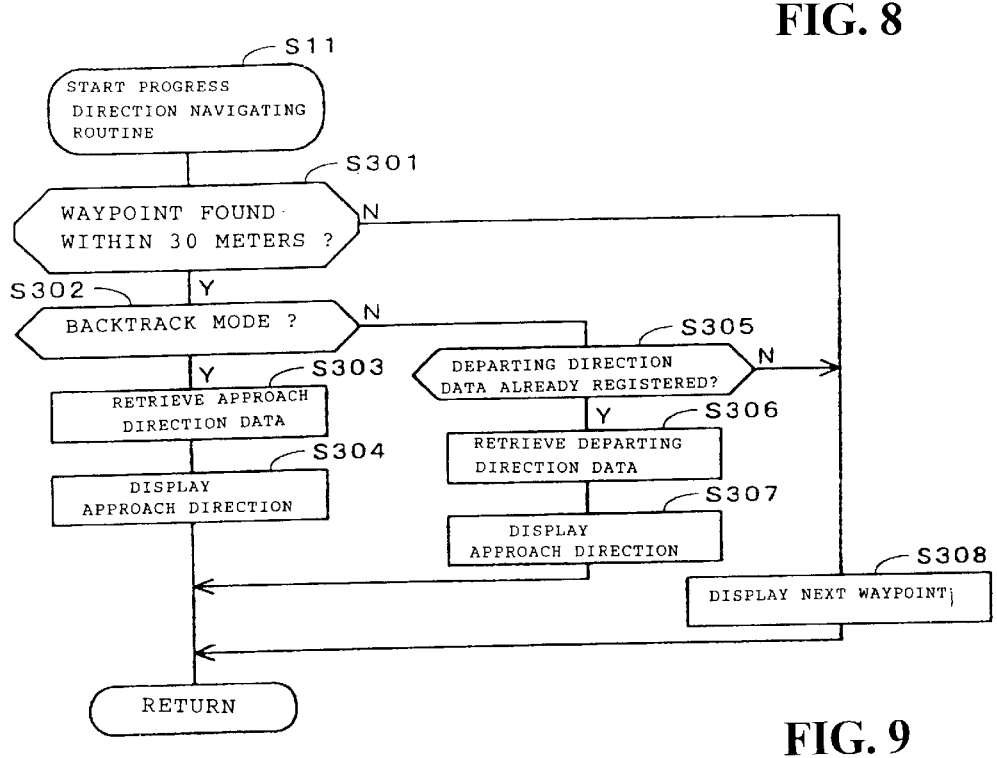
FIG. 8 is a flowchart describing an operation of progress direction navigation processing.
Figure 9:
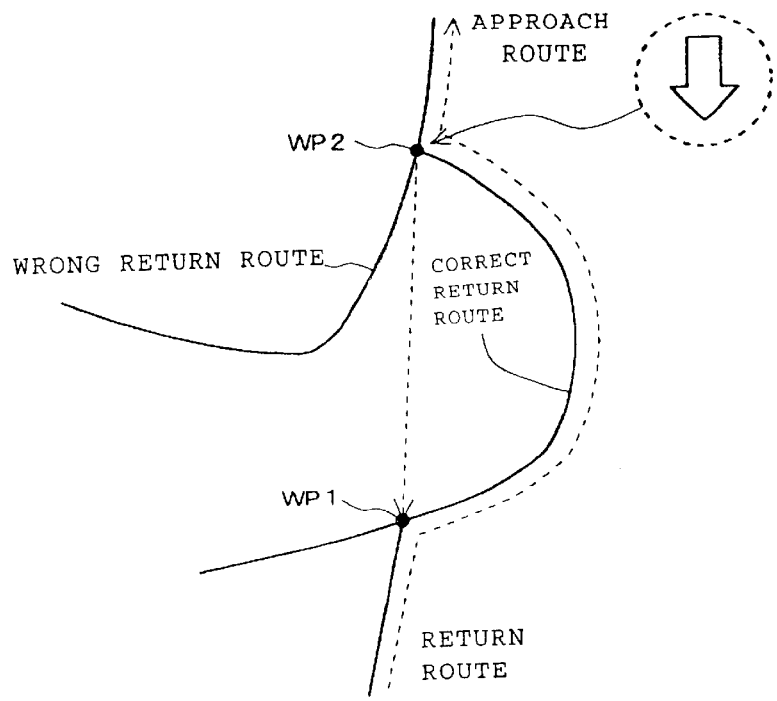
FIG. 9 is a diagram illustrating a drawback in the related art.

The following describes an operation of the present embodiment with reference to the flowcharts shown in FIGS. 5, 6, and 8.

When the system is activated, a one-minute timer of the CPU 34 starts in step S1 shown in FIG. 5. In step S2, whether the one-minute timer has timed out or not is determined. If the one-minute timer is found not timed out, "waypoint registration processing" of step S10 and "progress direction navigation processing" of step S11 to be described later are executed and then the procedure returns to step S1.

If the one-minute timer is found timed out, then the procedure goes to step S3, in which the positional data stored in each of storage areas $A_n$ ($A_0$ through $A_{10}$) in the buffer A of the last fix buffer 32 are shifted to storage areas $A_{n+1}$. In step S4, the current (most recent) positional data are stored in top storage area $A_0$ of the buffer A.

In step S5, count value T of a 10-minute timer is incremented. In step S6, whether count value T is equal to or higher than 10 (namely, whether 10 minutes have passed) or not is determined. For the first time, count value T is less than 10, so that the procedure goes to step S10. In step S10, "waypoint registration processing" shown in the flowchart of FIG. 6 is executed.

A waypoint is a via-point for which the user previously registers positional data beforehand or a via-point for which the user registers positional data when the vehicle passes the via-point. The waypoint is stored in the auxiliary storage device 38.

In step S201 of FIG. 6, whether a waypoint exists within 30 meters for example relative to the vehicle is determined on the basis of the registered waypoint and the positional data of the current position. When the vehicle has entered an area located within 30 meters from the registered waypoint or when a waypoint is newly registered at the current position by following a predetermined waypoint registering operation, it is determined that the waypoint exists within 30 meters and the procedure goes to step S202; otherwise, the procedure goes to step S210.

If no waypoint exists within 30 meters, then an approach flag $F_{in}$, which will be detailed later, is referenced in step S210. If the approach flag $F_{in}$ is found in a reset state (=0), this processing comes to an end, upon which the procedure goes to step S11 shown in FIG. 5, in which "progress direction navigation processing" to be described later is executed, upon which the procedure returns to step S1.

The above-mentioned processing operations are repeated. If count value T of the 10-minutes timer is found to be equal to or higher than 10, then, in step S7, the positional data (unregistered first) stored in each of storage areas $B_n$ of the buffer B is shifted to storage area $B_{n+1}$. In step S8, the positional data 10 minutes before stored in the storage area $A_{10}$ of the buffer A are copied into the top storage area $B_0$ of the buffer B. In step S9, count value T of the 10-minutes timer is reset.

Specifically, in the present embodiment, the most recent positional data are stored in storage area $A_0$ of the buffer A, the positional data 1 minute before are stored in storage area $A_1$, the positional data 2 minutes before are stored in storage area $A_2$, and so on. The positional data 10 minutes before are stored in storage area $B_0$ of the buffer B, the positional data 20 minutes before are stored in storage area $B_1$, the positional data 30 minutes before are stored in storage area $B_2$, and so on.

When the vehicle approaches the registered waypoint or a waypoint is newly registered, and this is detected in step S201 of FIG. 6, the procedure goes to step S202.

In step S202, the approach flag $F_{in}$ indicating that the vehicle has entered in an area within 30 meters from the waypoint is set. In step S203, whether "approach direction data" have already been registered with respect to this waypoint is determined. In the present embodiment, the approach direction data indicate the direction in which the vehicle approaches each waypoint.

If the approach direction data are found not registered, the approach direction data are computed in step S204. In step S205, the computed data are stored in the auxiliary storage device 38 as attribute data of the positional data of the waypoint.

If the movable body has approached the registered waypoint, the approach direction data are computed on the basis of the positional data of the current position, which is the current approach point, and the positional data of the waypoint. On the contrary, if the waypoint is newly registered at a via-point, the positional data of a position 30 meters for example before the via-point are read from the buffer A or B of the last fix buffer 32 as the positional data of a position predetermined interval before the via-point and the approach direction data are computed on the basis of the retrieved positional data and the positional data of the waypoint.

As will be described with reference to FIG. 7, the approach direction data is obtained as the longitude/latitude of the current position (method 1), a difference in longitude/latitude coordinates between the current position and the waypoint (method 2), or a bearing of the waypoint as viewed from the current position. The obtained approach position data are stored as associated with the positional data of the waypoint.

In step S206, whether "departing direction data" have already been registered or not is determined with respect to the waypoint. The departing direction data in this embodiment denote the data representing a departing direction from the waypoint of the vehicle.

If the departing direction data are found not registered, a departing flag $F_{out}$ is set in step S207; if the departing direction data are found registered, the departing flag $F_{out}$ is reset in step S208. Namely, this departing flag $F_{out}$ is set when the departing direction data have not been registered although the approach direction data have been registered.

Subsequently, when the vehicle has passed the waypoint and it is determined that the vehicle has departed 30 meters or more away from the waypoint in step S201, the approach flag $F_{in}$ is referenced in step S210. If the approach flag $F_{in}$ is found set and the departing flag $F_{out}$ is found set in step S211, then the departing direction data are computed in the same manner as above on the basis of the current positional data and the position data of the waypoint in step S212. The obtained departing direction data are stored in step S213.

FIG. 7 shows the format of waypoint data to be generated for each waypoint. In the first method shown in FIG. 7(a), "longitude information," "latitude information," "registration date," and "registration time" as waypoint positional data are registered along with "approach coordinates (longitude, latitude)" as approach direction data and "departing coordinates (longitude, latitude)" as departing direction data.

In the second method shown in FIG. 7(b), the approach direction data and the departing direction data are represented by differences [approach coordinates difference (longitude, latitude), departing coordinates difference (longitude, latitude)] between the positional coordinates of the waypoint and the approach coordinates and departing coordinates of the vehicle. According to this second method, these differences are only the data associated with the seconds among the coordinates information (degrees, minutes, and seconds) in many cases, so that the amount of the data associated with approach data and departing data can be reduced.

In the third method shown in FIG. 7(c), the approach direction data and the departing direction data are registered as the absolute bearing (approach bearing) of approach coordinates and the absolute bearing (departing bearing) of departing coordinates as viewed from the waypoint (in the figure, SSE denotes South South East and WSW denotes West South West). It should be noted that, as shown in FIG. 7(d), all directions may be divided by 16 for example and each division may be represented in a numeric value. According to the third method, the amount of data associated with the approach direction data and the departing direction data can be reduced further.

In the fourth method shown in FIG. 7(e), the relative bearing of the approach direction and departing direction is represented as an approach departing bearing, thereby further reducing the amount of data.

Referring to FIG. 6 again, in step S214, the departing flag $F_{out}$ is reset. If the departing flag $F_{out}$ is found not set in step S211, then the approach flag $F_{in}$ is reset in step S215.

Subsequently, the above-mentioned processing is executed every time the vehicle approaches and passes each registered waypoint or every time a waypoint is registered, thereby adding the approach direction data and departing direction data to each waypoint.

The following describes the approach direction navigation processing (step S11 shown in FIG. 5) based on the approach direction and departing direction data registered as above, with reference to the flowchart shown in FIG. 8. The "progress direction navigation processing" of the present embodiment is executed when traveling a return route and a second and subsequent approach routes. The navigation for the second and subsequent approach routes is effective when the vehicle of interest is used by a plurality of drivers and a next user is navigated to the same destination as the last user.

In step S301, whether or not a waypoint exists within 30 meters from the vehicle is determined. If no waypoint is found within 30 meters, then, in step S308, the direction of the waypoint to be passed next is displayed on the direction display section 6a of the display panel.

Figure 10:
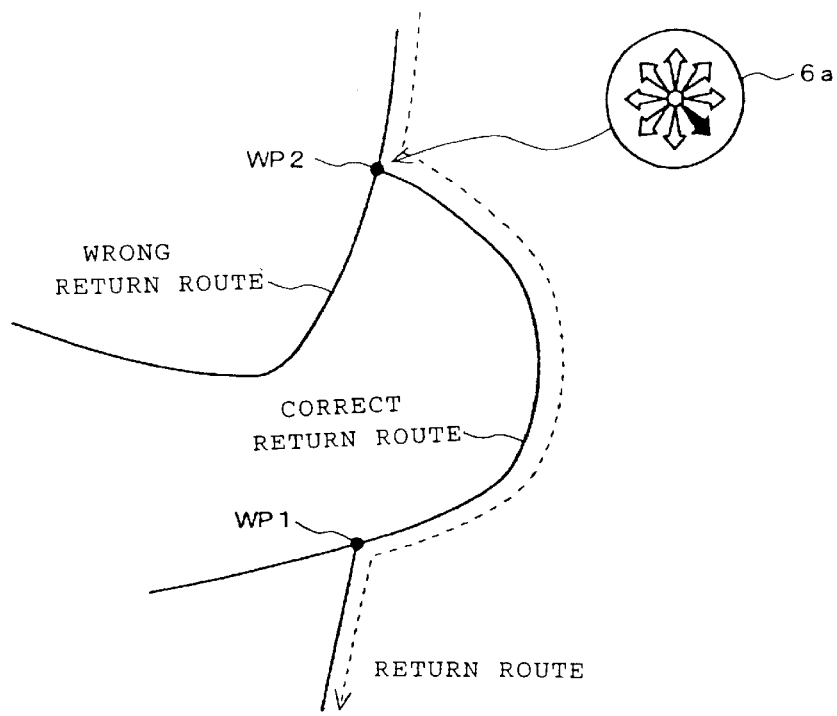
FIG. 10 is a diagram illustrating a navigation method in the return route.

If a waypoint is found within 30 meters, whether the backtrack mode is specified or not is determined in step S302. If the backtrack mode is found specified, then, in step S303, the approach direction data associated with the waypoint is retrieved from the auxiliary storage device 38. In step S304, the progress direction from the waypoint is displayed on the direction display section 6a on the basis of the above-mentioned approach direction data as shown in FIG. 10.

If the backtrack mode is found not specified in step S302, then whether the departing direction data have been registered or not, or whether the travel this time is the second or subsequent approach route travel is determined in step S305.

Figure 11:
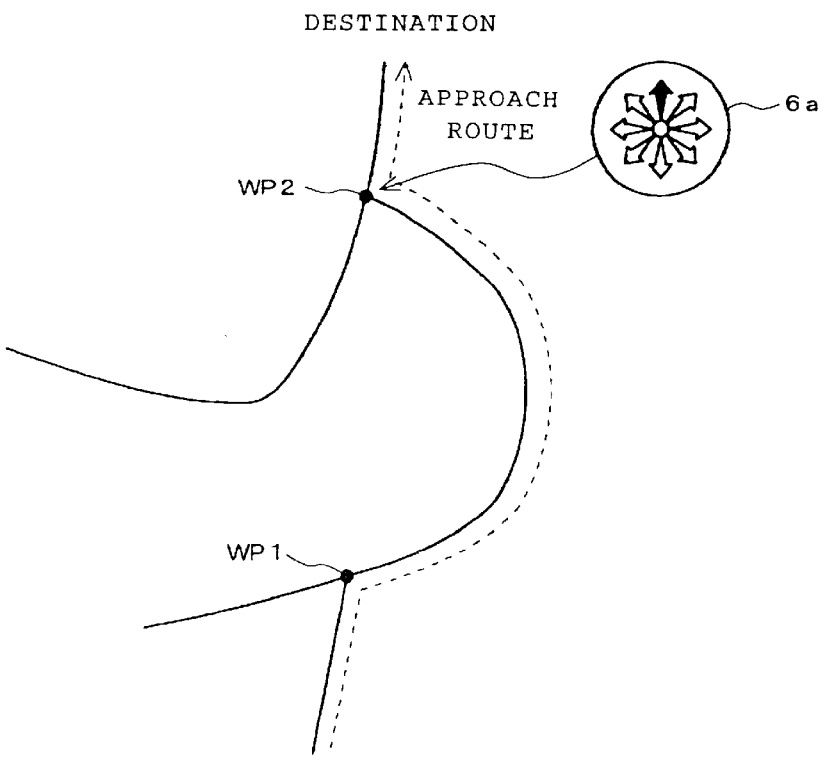
FIG. 11 is a diagram illustrating a navigation method for re-traveling an approach route.

If the departing direction data have been registered, then the departing direction data associated with the waypoint are retrieved from the auxiliary storage device in step S306. In step S307, the progress direction from the waypoint is displayed on the direction display section 6a of the display panel 6 on the basis of the above-mentioned departing direction data as shown in FIG. 11.

According to the present embodiment, the data indicative of the approach direction to each waypoint on an approach path are registered. When passing each waypoint on a return route, the vehicle is navigated in a predetermined progress direction from each waypoint on the basis of the registered approach direction data. Consequently, the vehicle on the return route can be navigated in the normal progress direction along the approach route.

Furthermore, according to the present embodiment, data indicative of the departing direction from a waypoint are registered for every waypoint on an approach route. When passing each waypoint on the second or subsequent approach route, the vehicle is navigated in a predetermined progress direction from each waypoint on the basis of the registered departing direction data. Consequently, the vehicle can be navigated in the normal progress direction along the last route.

In the above-mentioned embodiment, the last fix buffer 32 is constituted by a pair of FIFO buffers A and B. It will be apparent that the last fix buffer 32 may also be constituted by three or more FIFO buffers.

Figure 12:
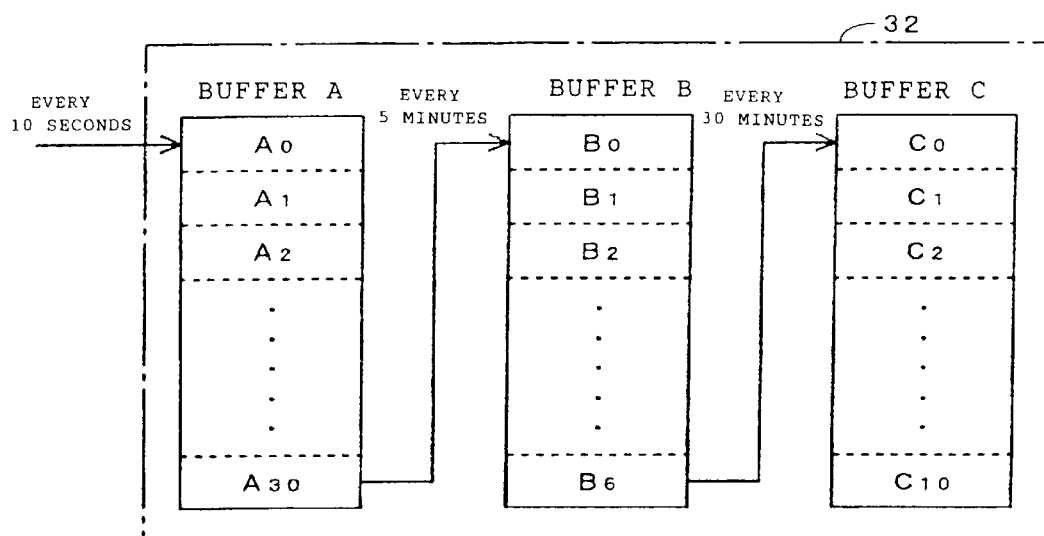
FIG. 12 is a diagram illustrating a configuration of the second embodiment of the last fix buffer.
Figure 13:
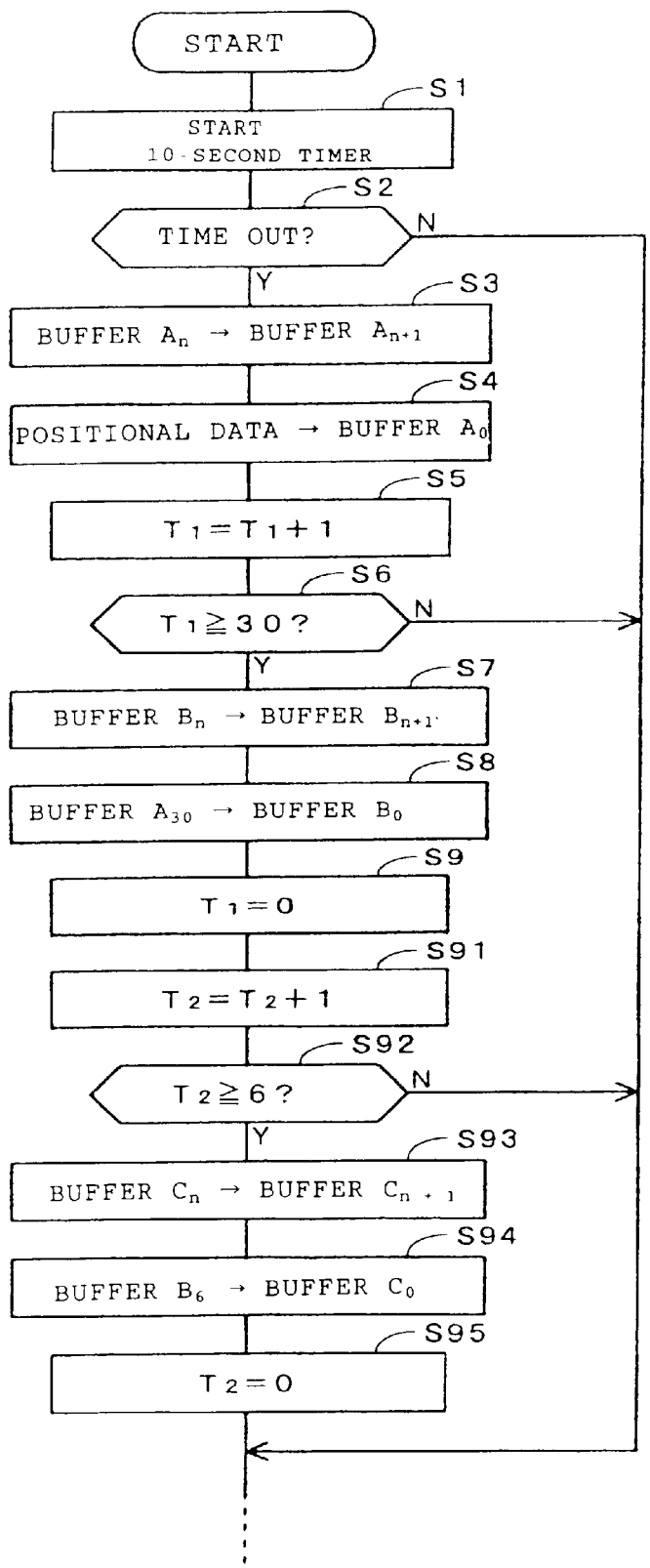
FIG. 13 is a flowchart describing a method of registering positional data into the last fix buffer shown in FIG. 12.

FIG. 12 shows the last fix buffer 32, which is constituted by three FIFO buffers A, B, and C. FIG. 13 is a flowchart describing a method of registering positional data into the last fix buffer 32.

In step S1, a 10-second timer of the CPU 34 starts. In step S2, if the 10-second timer is found timed out, the procedure goes to step S3, in which the positional data (not registered for the first time) stored in each of storage areas $A_n$ ($A_0$ through $A_{30}$) of the buffer A of the last fix buffer 32 are shifted to each of the storage areas $A_{n+1}$. In step S4, the current (most recent) positional data are stored in the top storage area $A_0$ of the buffer A.

In step S5, a 10-second counter T1 is incremented. In step S6, if the 10-second counter T1 is found equal to or higher than 30 (namely, 5 minutes have passed), then, in step S7 the positional data stored in each of the storage areas $B_n$ of the buffer B are shifted to each of the storage areas $B_{n+1}$. In step S8, the positional data 5 minutes before stored in the storage area $A_{30}$ of the buffer A are copied into the top storage area $B_0$ of the buffer B. In step S9, the 10-second counter T1 is reset.

In step S91, a 5-minute counter T2 is incremented. In step S92, if the 5-minute counter T2 is found equal to or higher than 6 (namely, 30 minutes have passed), then, in step S93, the positional data stored in each of the storage areas $C_n$ of the buffer C are shifted to each of the storage areas $C_{n+1}$. In step S94, the positional data 30 minutes before stored in the storage area $B_6$ of the buffer B are copied into the top storage area $C_0$ of the buffer C. In step S95, the counter T2 is reset.

Specifically, in the present embodiment, the storage area $A_0$ of the buffer A stores the most recent positional data, the storage area $A_1$ stores the positional data 10 seconds before, the storage area $A_2$ stores the positional data 20 seconds before, and so on and so forth. Likewise, the storage area $B_0$ of the buffer B stores the positional data 5 minutes before, the storage area $B_1$ stores the positional data 10 minutes before, and so on and so forth. The storage area $C_0$ of the buffer C stores the positional data 30 minutes before, the storage area $C_1$ stores the positional data 60 minutes before, and so on and so forth.

In the above-mentioned present embodiment, the positional data are registered for every predetermined interval of time. It will be apparent that the positional data may also be registered for every predetermined travel distance.

Figure 14:
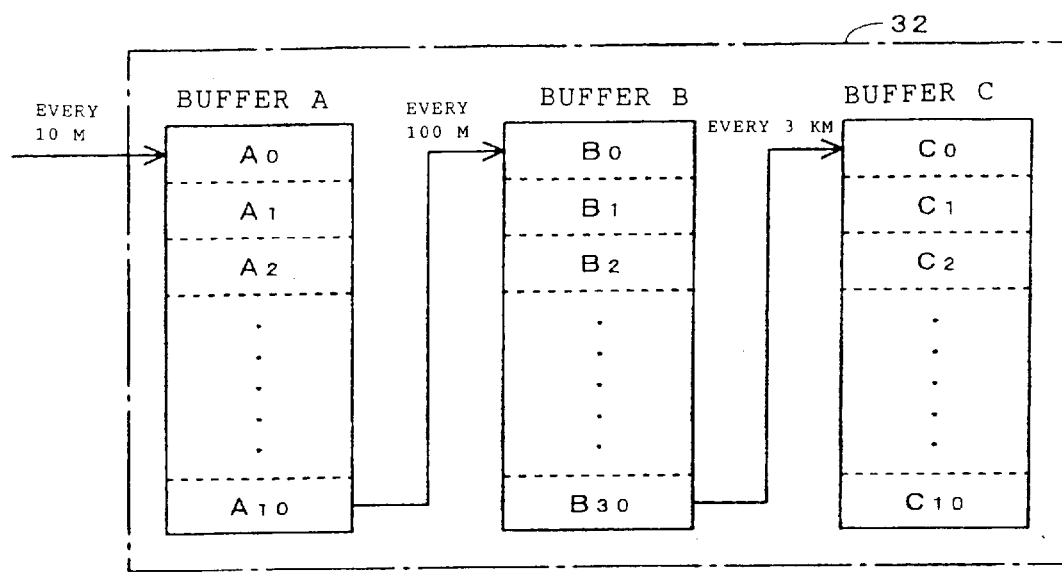
FIG. 14 is a diagram illustrating a configuration of the third embodiment of the last fix buffer.
Figure 15:
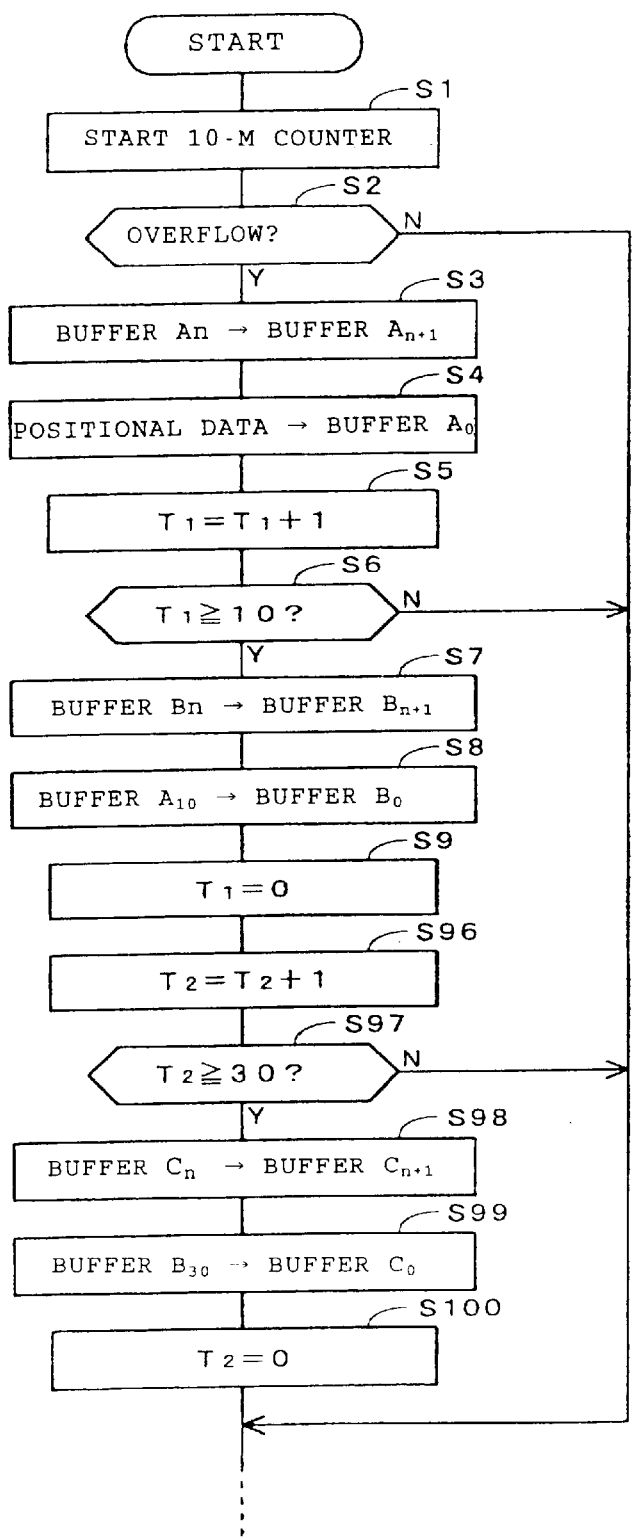
FIG. 15 is a flowchart describing a method of registering positional data into the last fix buffer shown in FIG. 14.

FIG. 14 shows the last fix buffer 32 in which positional data are registered at every predetermined travel distance. FIG. 15 is a flowchart describing a method of registering positional data in the last fix buffer 32 of FIG. 14.

In step S1, a 10-meter (m) counter of the CPU 34 starts counting. In step S2, if the 10-meter count is found overflowing, then the procedure goes to step S3, in which the positional data stored in each of the storage areas $A_n$ ($A_0$ through $A_{10}$) of the buffer A of the last fix buffer 32 are shifted to each of the storage areas $A_{n+1}$. In step S4, the current (most recent) positional data are stored in the top storage area $A_0$ of the buffer A.

In step S5, the 10-meter counter T1 is incremented. In step S6, if the 10-meter counter T1 is found equal to or higher than 10 (namely, 100 meters have been traveled), then, in step S7, the positional data stored in each of the storage areas $B_n$ of the buffer B are shifted to each of the storage areas $B_{n+1}$. In step S8, the positional data stored in the storage area $A_{10}$ of the buffer A are copied into the stop storage area $B_0$ of the buffer B. In step S9, the 10-meter counter T1 is reset.

In step S96, a 100-meter counter T2 is incremented. In step S97, if the 100-meter counter T2 is found equal to or higher than 30 (namely, 3 kilometers have been traveled), then, in step S98, the positional data stored in each of the storage areas $C_n$ of the buffer C are shifted to each of the storage areas $C_{n+1}$. In step S99, the positional data 3 kilometers before stored in the storage area $B_{30}$ of the buffer B are copied into the top storage area $C_0$ of the buffer C. In step S95, the 100-meter counter T2 is reset.

Specifically, in the present embodiment, the storage area $A_0$ of the buffer A stores the most recent positional data, the storage area $A_1$ stores the positional data 10 meters before, the storage area $A_2$ stores the positional data 20 meters before, and so on and so forth. Likewise, the storage area $B_0$ of the buffer B stores the positional data 100 meters before, the storage area $B_1$ stores the positional data 200 meters before, and so on and so forth. The storage area $C_0$ of the buffer C stores the positional data 3 kilometers before, the storage area $C_1$ stores the positional data 6 kilometers before, and so on and so forth.

As described above, according to the present invention, the following effects can be achieved.

The data indicative of the approach direction to a waypoint are registered for every waypoint in an approach route.

When passing each waypoint on a return route, the vehicle is navigated in a predetermined progress direction from each waypoint on the basis of the registered approach direction data. Consequently, the vehicle on the return route can be navigated in the normal progress direction along approach route.

The data indicative of the departing direction from a waypoint are registered for every waypoint on an approach route. When passing each waypoint on the second or subsequent approach route, the vehicle is navigated in a predetermined progress direction from each waypoint on the basis of the registered departing direction data. Consequently, the vehicle can be navigated in the normal progress direction along the last route.

The movable body's travel routes before and after each waypoint are controlled by the data indicative of the approach direction to the waypoint of interest and/or the data indicative of the departing direction from the waypoint of interest. Consequently, the vehicle can be correctly navigated with a small storage capacity.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A movable body progress direction navigating apparatus for navigating a movable body in a predetermined direction, comprising:
   a position detector for continuously detecting positional data of a movable body to obtain a position thereof;
   a directional data generator for generating, on the basis of said position of said movable body, at least one of approach directional data obtained when said movable body has entered into a predetermined via-point and departing directional data obtained when said movable body has departed from said via-point;
   a directional data storage for storing at least one of said approach directional data and said departing directional data in association with positional data of said via-point; and
   when said movable body has approached said via-point, a navigator for navigating said movable body in a predetermined progress direction, on the basis of at least one of said approach directional data and said departing directional data, stored in said directional data storage.

2. The movable body progress direction navigating apparatus according to claim 1, wherein said via-point is a current position of said movable body at a point of time when a predetermined registration operation has been made.

3. The movable body progress direction navigating apparatus according to claim 1, wherein said via-point is a predetermined position which was registered beforehand.

4. The movable body progress direction navigating apparatus according to claim 1, wherein said directional data generator computes said approach directional data on the basis of positional data of said movable body at a point, which is a predetermined interval before said movable body enters a predetermined via-point, and positional data of said predetermined via-point.

5. The movable body progress direction navigating apparatus according to claim 2, wherein said directional data generator computes said approach directional data on the basis of positional data of said movable body at a point, which is a predetermined interval before said movable body enters a predetermined via-point, and positional data of said predetermined via-point.

6. The movable body progress direction navigating apparatus according to claim 3, wherein said directional data generator computes said approach directional data on the basis of positional data of said movable body at a point, which is a predetermined interval before said movable body enters a predetermined via-point, and positional data of said predetermined via-point.

7. The movable body progress direction navigating apparatus according to claim 1, wherein said directional data generator computes said departing directional data on the basis of positional data of said movable body at a point which is a predetermined interval away from a predetermined via-point and positional data of said predetermined via point.

8. The movable body progress direction navigating apparatus according to claim 2, wherein said directional data generator computes said departing directional data on the basis of positional data of said movable body at a point which is a predetermined interval away from a predetermined via-point and positional data of said predetermined via point.

9. The movable body progress direction navigating apparatus according to claim 3, wherein said directional data generator computes said departing directional data on the basis of positional data of said movable body at a point which is a predetermined interval away from a predetermined via-point and positional data of said predetermined via point.

10. The movable body progress direction navigating apparatus according to claim 4, wherein said directional data generator uses, as said approach directional data, a difference between coordinates of said predetermined via-point and coordinates of said movable body at a point which is said predetermined interval short of said via-point.

11. The movable body progress direction navigating apparatus according to claim 5, wherein said directional data generator uses, as said approach directional data, a difference between coordinates of said predetermined via-point and coordinates of said movable body at a point which is said predetermined interval short of said via-point.

12. The movable body progress direction navigating apparatus according to claim 6, wherein said directional data generator uses, as said approach directional data, a difference between coordinates of said predetermined via-point and coordinates of said movable body at a point which is said predetermined interval short of said via-point.

13. The movable body progress direction navigating apparatus according to claim 4, wherein said directional data generator uses, as said approach directional data, a bearing at a point which is said predetermined interval short of said predetermined via-point.

14. The movable body progress direction navigating apparatus according to claim 5, wherein said directional data generator uses, as said approach directional data, a bearing at a point which is said predetermined interval short of said predetermined via-point.

15. The movable body progress direction navigating apparatus according to claim 6, wherein said directional data generator uses, as said approach directional data, a bearing at a point which is said predetermined interval short of said predetermined via-point.

16. The movable body progress direction navigating apparatus according to claim 4, wherein said directional data generator uses, as said approach direction data, a relative bearing of a point which is short of said predetermined interval relative to a point which is away by said predetermined interval.

17. The movable body progress direction navigating apparatus according to claim 7, wherein said directional data generator uses, as said departing directional data, a difference between coordinates of said predetermined via-point and coordinates of said movable body at a point which is departed from said predetermined via-point by said predetermined interval.

18. The movable body progress direction navigating apparatus according to claim 7, wherein said directional data generator uses, as said departing directional data, a bearing of a point which is departed away from said predetermined via-point by said predetermined interval.

19. The movable body progress direction navigating apparatus according to claim 7, wherein said directional data generator uses, as said departing directional data, a relative bearing of a point which is away, by said predetermined interval, from said point which is short of said predetermined interval by said predetermined interval.

* * * * *